United States Patent Office 3,490,816
Patented Jan. 20, 1970

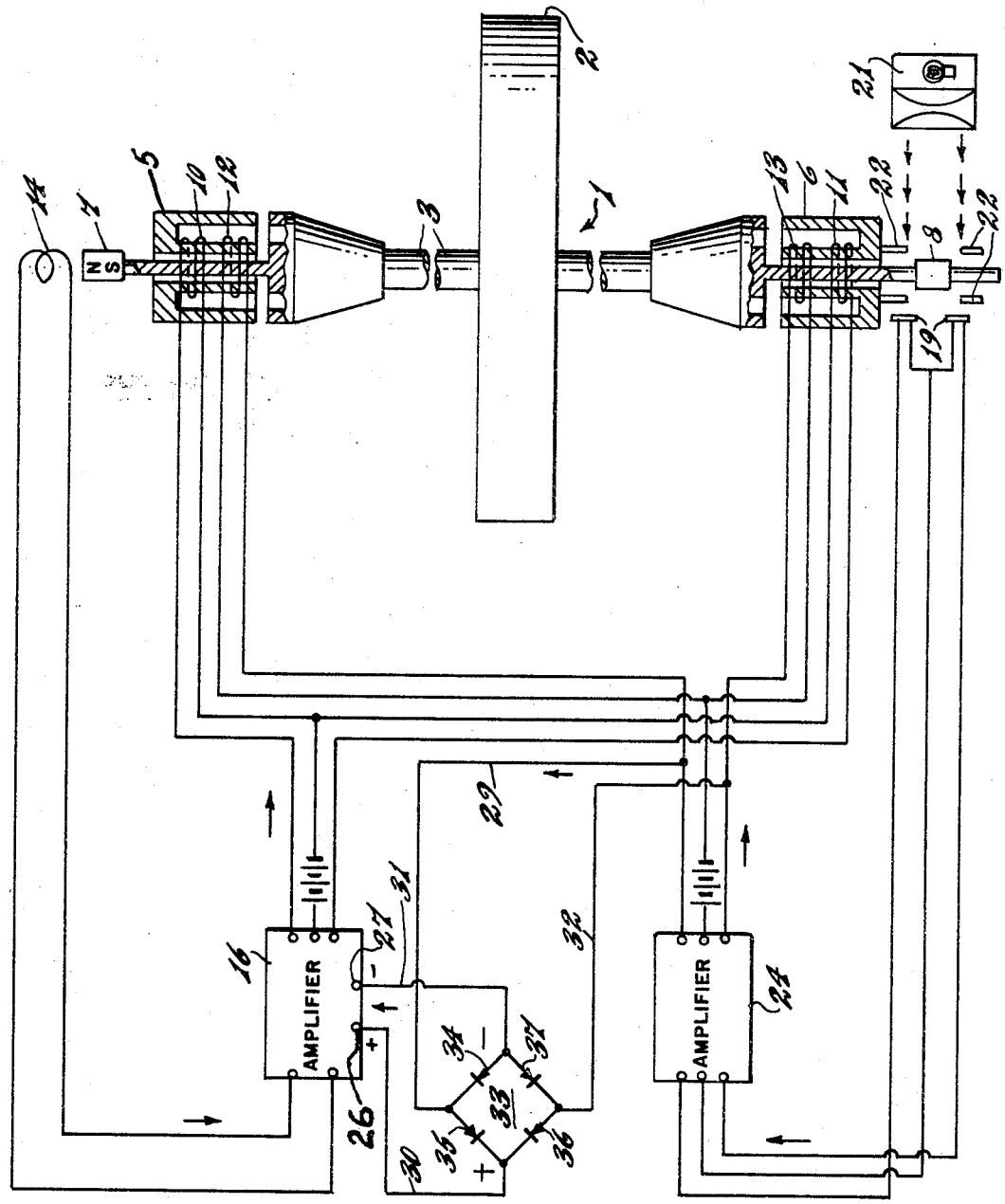

3,490,816
REGULATED SUSPENSION SYSTEM
Joseph Lyman, Northport, N.Y., assignor to Cambridge Thermionic Corporation, Cambridge, Mass., a corporation of Massachusetts
Filed Dec. 18, 1967, Ser. No. 691,482
Int. Cl. F16c 39/06
U.S. Cl. 308—10                                 4 Claims

ABSTRACT OF THE DISCLOSURE

A suspension system consisting of a pair of controllable force-appliers such as electromagnets oppositely disposed about a suspended object, such as a rotor, to exert oppositely directed forces thereon, said force-appliers being included in a servo system arranged to vary their forces differentially for opposing movement of the object away from its desired position between said force-appliers, and so arranged, as by means of an electrically variable amplification control circuit, to reduce the sensitivity to rate of movement of the object as the displacement of the object from its desired position increases.

BACKGROUND OF THE INVENTION

The present invention relates to suspension systems, and is particularly concerned with improved suspension apparatus in which forces exerted on a suspended object to retain it in a desired position are regulated according to its displacement from said position and its rate of movement relative to said position.

Examples of suspension systems in which electromagnets are used for exerting the suspension forces are set forth in U.S. Patent No. 3,243,238, U.S. patent application Ser. No. 522,726, filed Jan. 24, 1966, and U.S. patent application Ser. No. 691,284 filed concurrently with this application and entitled Suspension System. The above-identified patent and applications disclose suspension systems which support the weight of the suspended object when operated in the earth's gravitational field or under acceleration forces of comparable magnitude, the magnetic suspension forces being varied according to the displacement and rate of movement of the suspended object. Alternating or direct current energization of the suspending magnets may be employed, one advantage of direct-current energization being its capability of exerting forces for a given amount of power applied.

As described more particularly in my above-designated U.S. patent applications, the rate-of-movement responsive signal component should in general be made to predominate over the displacement responsive component in regulating the electrical energization of the force applying magnets. If the suspended object is at or near the desired position, e.g., substantially evenly spaced from two oppositely disposed force applying magnets, the variation of the energization of said oppositely disposed magnets in accordance with a highly amplified version of a signal representative of rate of movement toward one of the magnets and away from the other strongly resists motion of the object. By greatly depressing the energization of the magnet toward which the suspended object moves and greatly increasing the energization of the opposite magnet even in response to a relatively slow rate of movement, the system is made to perform as though the linear movement of the suspended object were damped by a very viscous fluid medium. To this control effect is added a further control component in response to displacement of the suspended object. By virtue of the simultation of high viscosity damping to oppose motion of the object from one magnet toward the other, and superimposing a long-term positional restoring force component, desirable control characteristics are provided.

When the suspended object of the system described above is at or very near its neutral position, the tendency of the rate control component to predominate over the displacement component is especially advantageous. It provides great stiffness against any substantial velocity of movement of the object away from its intended position. On the other hand, when the suspended object is appreciably displaced from its neutral position, the predominance of the rate control component may under some circumstances cause undersirable delay in restoration of the object to its neutral position.

SUMMARY OF THE INVENTION

In accordance with the present invention, the relative contributions of the rate responsive signal and the displacement responsive signal to the control effect are varied in accordance with the magnitude of the displacement of the suspended object, so that the predominance of the rate signal is reduced as the displacement from the intended position increases. In a preferred embodiment of the invention, this is accomplished by employing an automatic gain control circuit to reduce the gain of the rate responsive signal amplifier to a minimum value when the suspended element is at a positional extreme and to permit maximum gain when the suspended element is in its normal position. This automatic gain control circuit may employ rectifiers, as more fully set forth below, to reduce the gain of the rate responsive signal amplifier when the suspended element moves away in either direction from its normal position. Accordingly, the amplifier responsive to the displacement signal is enabled to bring about sufficient magnetic attraction by a force applying stator magnet to readily move the suspended element away from an extreme position adjacent the opposite force applying stator magnet. Without such gain reduction, a very small rate responsive signal in the rate amplifier greatly delays the action exerted by the more distant stator magnet which is at a disadvantage because of a gap length nearly double its normal length.

BRIEF DESCRIPTION OF THE DRAWING

For a fuller understanding of the invention, reference may be had to the following description taken in connection with the accompanying drawing. In the drawing, a DC pivot bearing is shown schematically in partial cross-section together with a diagrammatic wiring arrangement for the bearing.

DESCRIPTION OF THE PREFERRED EMBODIMENT

Referring to the drawing, a suspended element 1 is shown, comprising a rotor 2 attached to a shaft 3. Extensions of shaft 3 extend through magnets 5 and 6 which operate as stators for the system. A permanent magnet 7 is attached to one end of shaft 3 while an opaque piston 8 is attached to its opposite end. Two force coils, viz, a rate responsive force coil 10 and a displacement responsive force coil 12, are located in stator magnet 5, and two further force coils 11 and 13 for rate and displacement control, respectively are located in magnet 6.

An axial velocity or rate responsive signal, which functions independently of rotor rotation, is derived from a sensing device—a coil 14 which is in the field of permanent magnet 7. This signal is amplified by a high gain amplifier 16 and applied to rate responsive force coils 10 and 11 in such direction as to oppose motion of the suspended element, up or down. The signal obtained by the rate responsive amplifier is of such a level that several pounds of force are made to oppose as small a velocity as ⅜ of an inch per minute. The result of an application of this type signal in this manner is to give the equivalent of operation of the suspended element in a one-dimensional high viscosity liquid. Since the resulting magnetic field is aligned with the longitudinal axis, it imposes no appreciable restraint or damping to rotation of the suspended element.

In order to sense any displacement of the suspended object from its intended position between the upper and lower stator magnets 5 and 6, the opaque piston 8 is used to control the differential exposure of photocells 19—19 to a light source 21 through light baffles 22. The signal obtained from the photocell is differentially amplified in amplifier 24 and applied to displacement responsive force coils 12 and 13. These force coils are axially aligned with the rate or velocity responsive force coils on the same cores but the respective velocity and displacement responsive signals are not mixed electrically.

Since the velocity responsive signals constrain the up and down velocity of the suspended element to relatively low values, it is neither necessary nor desirable for the displacement differential amplifier 24 to have a fast time constant. Indeed, it is desirable to provide some time delay so that transilient movement is reduced—permitting the suspended element to seek its center position relatively slowly.

In accordance with the present invention, the output signal from the displacement responsive amplifier 24 is coupled to gain control terminals 26 and 27 on the rate responsive amplifier 16 by means of conductors 29, 32 and 30, 31. Bridge rectifier 33, including four rectifier elements 34, 35, 36, 37 is connected to these conductors in such a manner that current will flow in only one direction between the bridge rectifier output terminals connected to amplifier 16. The amplifier 16 is a well-known variable gain amplifier, i.e., an amplifier so arranged as to have its gain reduced as the negative potential of terminal 27 is increased. The equilibrium condition for the apparatus shown in the drawing prevails when the suspended element 1 is so positioned between force applying magnets 5 and 6 that the upper force applying magnet 5 exerts an upwardly directed force on the suspended element 1 exceeding the downwardly directed force exerted by magnet 6 by an amount equal to the weight of the suspended element (assuming the operation of the system in a gravitational field such as the earth's gravity). This differential of force exerted by the upper force applying magnet 5 and the lower force applying magnet 6 may be provided in any of several ways, for example, by a larger winding on the upper displacement-responsive force coil 12 than the winding of the lower force coil 13, so arranged as to provide a predominance of the upwardly directed force in the event that conductors 29 and 32 are at equal potential.

Assuming that the suspended element is in the above-described equilibrium condition, with no potential difference between conductors 29 and 32, the bridge rectifier 33 produces no output potential difference between its output conductors 30 and 31, and accordingly, the potential of terminal 27 is the same as the potential of terminal 26, i.e., ground potential. Under these conditions, the amplifier 16 has maximum gain (amplification factor) for any input signal which it receives from the rate responsive means 7, 14. Accordingly, the force applying units 5 and 6 are controlled primarily in accordance with the rate responsive signal. When the suspended object is displaced an appreciable distance from its intended position, toward one force applying unit and away from the other, a substantial potential difference is produced between conductors 29 and 32. By virtue of the bridge rectifier 33, this potential difference produces a substantial negative potential at conductor 31 relative to the potential of conductor 30, and hence provides a substantial negative potential at the gain control terminal 27 of amplifier 16. This results in substantial reduction of the responsiveness to the rate signal coming from means 7, in relation to the responsiveness of the system to the displacement signal component. Accordingly, the force differential produced by the displacement signals suffices to bring the suspended element toward its intended position with less sluggishness.

While the present invention has been illustrated with respect to a single axis control system, it will be understood that the automatic gain control circuit is applicable to a system having a control system operating on several axes.

It will also be understood that while only one method for centering the suspended element or rotor between the upper and lower pole positions has been shown, other equivalent means of obtaining an electrostatic or electromagnetic signal may be employed.

Obviously, many other modifications and variations of the invention as hereinbefore set forth may be made without departing from the spirit and scope thereof.

What is claimed is:

1. Electrically operated suspension apparatus comprising
   first and second electric power actuated, force-applying units spaced apart along an axis,
   a movable object suspended between said first and second force-applying units and subjected to opposing forces tending to pull it toward one or the other of said units,
   means responsive to the rate of movement of said object between said force-applying units for differentially varying the electric energization thereof to oppose movement toward either unit and away from the other,
   means responsive to displacement of said object from an intended position between said first and second force-applying units for introducing a corrective net force component tending to return the object to said intended position, and
   means responsive to displacement of said object for reducing the sensitivity of said rate responsive means as the displacement of said movable object from said intended position increases, in order to minimize delay in restoration of said movable object to said intended position.

2. Electrically operated suspension apparatus comprising first and second electric power actuated force-applying units spaced apart along an axis,
   a movable object suspended between said first and second force - applying units and subjected to opposing forces tending to pull it toward one or the other of said units,
   means responsive to the rate of movement of said object between said force-applying units for differentially varying the electric energization thereof to oppose movement toward either unit and away from the other,
   and means responsive to displacement of said object from an intended position between said first and second force-applying units for introducing a corrective net force component tending to return the object to said intended position and for varying the responsiveness to rate of movement according to the displacement of said object from said intended position,
   said means responsive to the rate of movement of said object comprising a variable-gain amplifier having a gain control terminal, and
   said means responsive to displacement including means for supplying to said gain control terminal a voltage of predetermined polarity varying in strength with the magnitude of the displacement of said object from said intended position.

3. Electrically operated suspension apparatus as defined in claim 2, wherein
   said means for supplying to said gain control terminal a voltage of predetermined polarity comprises means for rectifying a reversible-polarity signal varying in accordance with displacement of the object.

4. Magnetic suspension apparatus comprising first and second electric power-responsive force-applying units spaced apart from each other, a movable object suspended between said first and second force-applying units, means responsive to displacement of said object from its intended position between said force-applying units for electrically energizing said units differentially to pull said object toward said intended position, and means responsive to rate of movement of said object toward one force-applying unit for differentially increasing the energization of the force-applying units in favor of the opposite one of said units, said means responsive to displacement of said object including means for reducing the control effect of said rate responsive means on said force-applying units with increased displacement of said object from said intended position in order to minimize delay in restoration of said movable object to said intended position.

References Cited

UNITED STATES PATENTS

| | | | |
|---|---|---|---|
| 2,605,641 | 8/1952 | Barkalow | 74—5.7 |
| 2,797,912 | 7/1957 | Trostler | 308—10 |
| 2,856,238 | 10/1958 | Dacus | 308—10 |
| 3,243,238 | 3/1966 | Lyman | 308—10 |
| 3,262,325 | 7/1966 | Senstad. | |

MILTON O. HIRSHFIELD, Primary Examiner

R. SKUDY, Assistant Examiner